United States Patent [19]

Eggert, Jr.

[11] 4,267,895
[45] May 19, 1981

[54] AUTOMOTIVE BODY FRAME FOR A COMBINED ENGINE AND BATTERY OPERATED VEHICLE

[75] Inventor: Walter S. Eggert, Jr., Huntington Valley, Pa.

[73] Assignee: The Budd Company, Troy, Mich.

[21] Appl. No.: 37,693

[22] Filed: May 10, 1979

[51] Int. Cl.³ .................... B60K 11/04; B60K 7/00
[52] U.S. Cl. .................... 180/54 A; 180/54 F; 180/65 A; 180/68 R; 180/68.5; 180/89.1; 180/291; 180/297; 296/37.1; 296/189
[58] Field of Search .................... 180/232, 54 A, 54 F, 180/297, 296, 65 A, 68.5, 68 R, 69 R, 69 C, 312, 65 B, 89.1; 296/188, 189, 208, 193, 194, 195, 197, 198, 37.1

[56] References Cited

U.S. PATENT DOCUMENTS

| | | | |
|---|---|---|---|
| 2,128,930 | 9/1938 | Fageol et al. | 180/54 F |
| 2,511,549 | 6/1950 | Simi | 180/54 A |
| 2,527,487 | 10/1950 | Paton | 180/54 A |
| 2,581,072 | 1/1952 | Brezek | 180/54 A |
| 2,731,098 | 1/1956 | Saives | 180/54 A |
| 3,011,577 | 12/1961 | Komenda | 180/54 A |
| 3,047,331 | 7/1962 | Porsche et al. | 180/54 F |
| 3,211,249 | 10/1965 | Papst | 180/65 A |
| 3,517,765 | 6/1970 | Wessells | 296/195 |
| 3,896,896 | 7/1975 | Saitoh | 296/189 |
| 3,983,952 | 10/1976 | McKee | 180/68.5 |

FOREIGN PATENT DOCUMENTS

| | | | |
|---|---|---|---|
| 1455707 | 5/1969 | Fed. Rep. of Germany | 296/195 |
| 2223880 | 11/1973 | Fed. Rep. of Germany | 296/189 |
| 430411 | 2/1948 | Italy | 180/54 F |

*Primary Examiner*—David M. Mitchell
*Attorney, Agent, or Firm*—A. L. Trueax, Jr.

[57] ABSTRACT

A body frame for an automotive vehicle, adapted to be selectively driven by either a conventional diesel engine or batteries, includes a passenger compartment for receiving front and rear seats. The body frame comprises a front structure having a front compartment disposed forwardly of the passenger compartment for storage of both the batteries and luggage. The rear structure provides a rear compartment for storing the engine and additional luggage space. The rear structure includes quarter panels having a pair of wheel housings to accomodate the rear wheels of the vehicle. The wheel housings are disposed rearwardly away from the location for the rear seat within the passenger compartment. The rear engine is disposed in the rear compartment over the wheel housings. The quarter panels also include side vents leading into plenum chambers in the rear compartment.

6 Claims, 7 Drawing Figures

AUTOMOTIVE BODY FRAME FOR A COMBINED ENGINE AND BATTERY OPERATED VEHICLE

So called "hybrid" automotive vehicles are known. Such vehicles, for example, use batteries to drive the vehicles for relatively short distances involving city driving with numerous stops and starts. For relatively long distances involving high speeds, such as in turnpike driving, the vehicle is driven by a conventional diesel engine. In such hybrid cars, means are provided to permit the operator to selectively switch to either battery or engine operation.

Automotive structures for supporting a rear engine, as would be involved in the present invention, are well known, one such structure being disclosed in a patent to H. W. Wessells III, et al U.S. Pat. No. 3,517,765. The use of battery storage areas at the front of the vehicle, of the type used in the present invention, is also known.

With the emphasis on fuel conservation in the automotive industry, automobiles have tended to become smaller and lighter. Also, the use of battery operation is being widely explored. Despite the design changes aimed at fuel conservation, maximum comfort, convenience, and safety of the passengers remain important considerations. The convenience involves providing sufficient storage of luggage in a minimum space.

In satisfying the above mentioned objectives in an automotive vehicle, an efficient cooling system for the engine and electronic components must be provided. It is desirable that the means for cooling come from the air outside of the vehicle. Side air vents for vehicles are disclosed in a patent to Wessels III, U.S. Pat. No. 3,520,243.

It is an object of this invention to provide an improved automotive frame structure for a vehicle in which the passenger compartment provides maximum comfort for five or less passengers in a vehicle.

It is a further object of this invention to provide an improved automotive frame structure for a vehicle which includes luggage space at the front and rear of the vehicle, while still accomodating the engine and electrical components.

It is still a further object of this invention to provide an improved automotive structure for a vehicle with improved means for providing air cooling of the engine and electronic components.

In accordance with the present invention, an automotive frame structure is provided for use with a vehicle, which may be selectively driven by batteries or by a conventional engine. A front compartment is disposed forwardly of the passenger compartment and is used to house the batteries and to provide luggage space. A rear compartment is disposed rearwardly of the passenger compartment and is used to store the engine, electrical components and to provide additional luggage space. Side quarter panels provide the side walls for the rear compartment. Each of the quarter panels include rear wheel wells to accommodate the rear wheels of the vehicle. The rear wheel wells or housings are disposed rearwardly away from the location for the rear seat of the passenger compartment. The quarter panels include vents extending from both sides of the frame structure to cause air to pass from outside the vehicle into plenum chambers in the rear compartment to cool the engine and other components.

Other objects and advantages of the present invention will be apparent and suggest themselves to those skilled in the art, from a reading of the following specification and claims, taken in conjunction with the accompanying drawings, in which:

Figure 1:
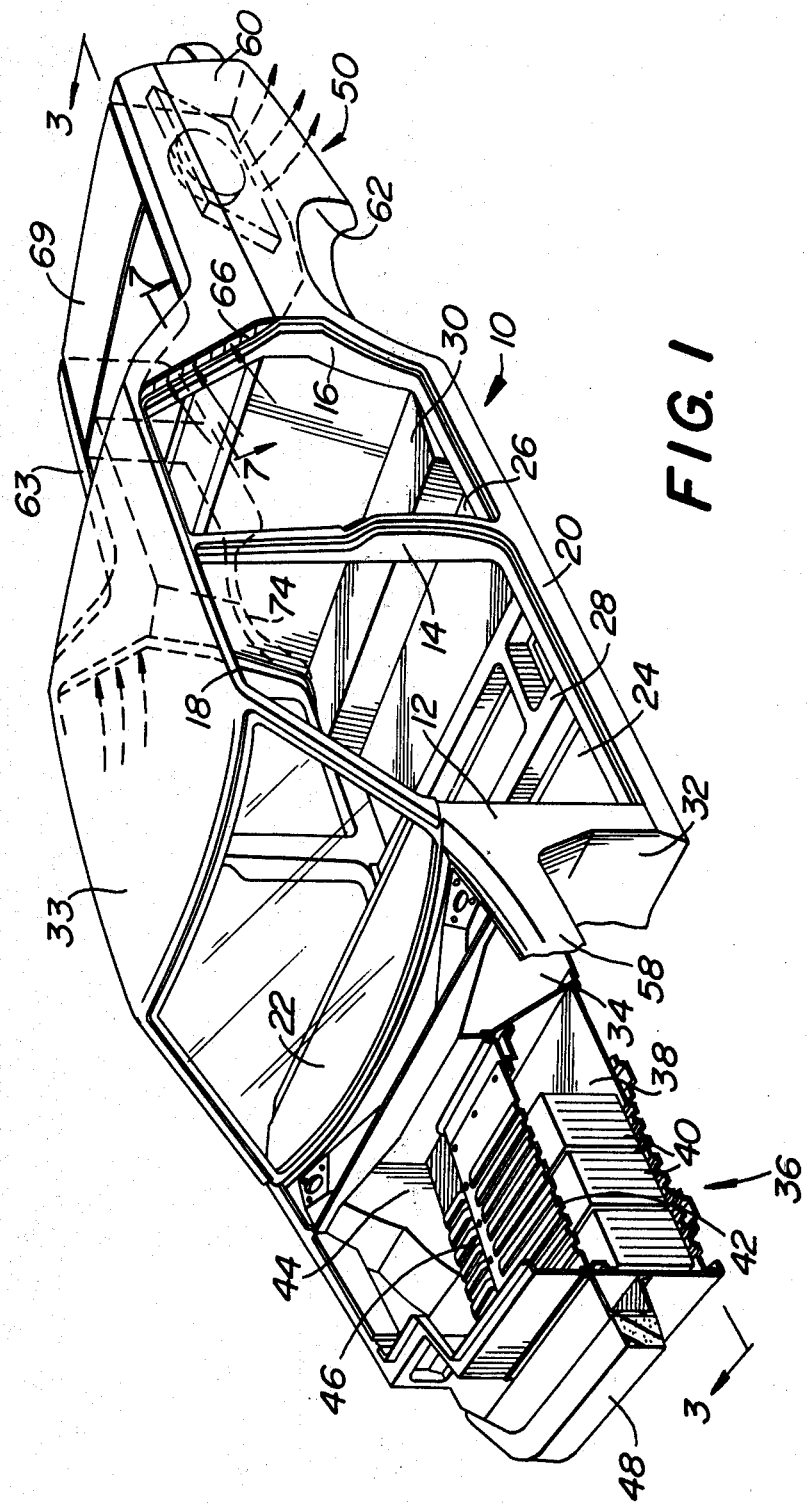
FIG. 1 is an isometric view, partly broken away, of a frame structure for an automobile vehicle, in accordance with the present invention.

Referring to the drawings, an automotive car body 10 is designed for a dual type of operation and therefore may be considered as a vehicle body for a "hybrid" vehicle. The first type of operation involves driving the vehicle with an electric motor driven by electrical energy stored in storage batteries. The other type of operation involves driving the vehicle with a engine, which may be a diesel engine, driven by conventional fuel. The operator may selectively choose this type of operation.

Details relating to the engines, batteries, electric motors, switching and electronic circuits, while physically illustrated, will not be shown or described in detail. Such details are well known to those skilled in the art and are not directly related to the present invention nor are such details necessary for the understanding of the present invention.

The structure involving the present invention involves two features. The first feature is directed to the overall design of the frame structure which provides more comfortable riding conditions for passengers and improved storage capacities for components and luggage. The second feature is directed towards the ventilation system for cooling the electronic and engine equipment.

Figure 2:
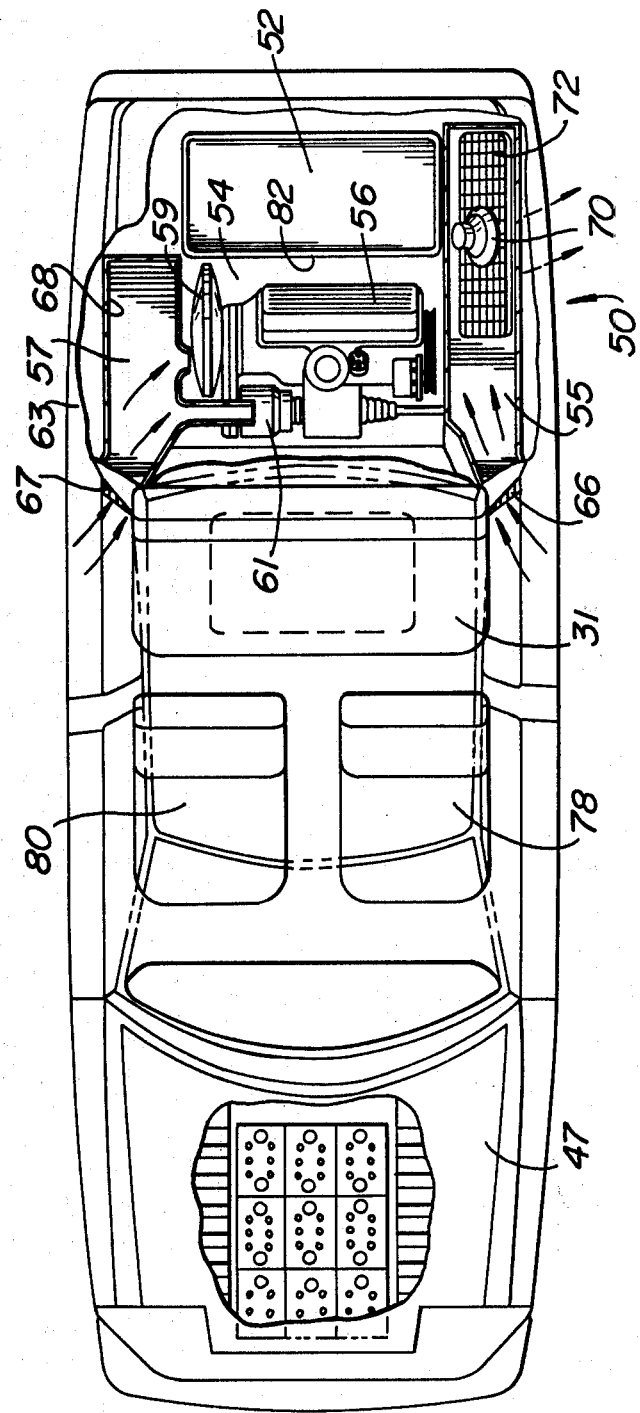
FIG. 2 is a top view, partly broken away, of the frame structure illustrated in FIG. 1.

The car body frame 10 includes an "A" post 12; "B" post 14 and "C" post 16 on both sides of the car frame. In describing the car body frame 10, only one side will be described if the same basic parts are also on the other side. A side frame assembly 18 connects the top of the posts 12, 14 and 16. Side sill 20 connects the bottom of the posts 12, 14 and 16. A cowl windshield assembly 22 is connected across the front seat compartment of the car body. The floor frame area includes a front floor area 24 and a rear floor area 26. A floor panel assembly 28 provides cross beams to support the front seats. A housing 30 or tank provides a storage tank for fuel, is disposed below the rear seat 31 (FIG. 2). A front foot board 32 and fire wall 34 are connected towards the front and above the front floor area. A roof structure 33 is connected between the side frame assemblies 18.

The forward end 36 of the car frame 10 comprises a front compartment including a lower battery storage area 38 for holding batteries 40 and an upper storage area 44 for storing luggage. The areas 38 and 44 are separated by a horizontal wall or structure 42 suitably mounted to the end structures of the car within the front compartment by any suitable means. A front foamed crush beam 46 for frontal crashes is also suitably connected in front and rear vertical wall structures within the front compartment. A hood 47 is adapted to close the front compartment including the battery area 38 and luggage area 44 in a conventional manner. A flexible foam bumper section 48 is provided at the front of the car frame. The front areas 38 and 44 of the front compartment are formed by the top hood 46 of conventional design and two front side panels 58.

The rear compartment of rear end 50 of the car comprises separate areas including an enclosed rear luggage area 52 and a separate engine area 54. Ventilation plenums 55 and 57 are provided on either side of the rear compartment, the details of which will be subsequently described. The engine 56, flywheel 59, electric motor 61, the various electronic components, carburetor and other mechanical components are located in the area 54 directly over the rear suspension of the car and rear wheel housings. The rear compartment includes a trunk door 69 and the two side quarter panels 60 and 63 extending rearwardly from the "C" posts 16. The engine, comprising the main weight, is disposed considerably more forward than is found in many conventional rear engine cars, similar in location to the mid-engine type high performance engine used in race cars. The location of the engine is made possible by having the seating arrangement disposed more forwardly than in conventional cars. The forwardly disposed engine 56, in addition to the advantage of making it possible for locating it over the rear suspension of the vehicle, makes it possible to provide a relatively large rear luggage area 52 in the rear compartment.

Quarter panels 60 and 63, disposed on both sides of the car frame 10, each include a wheel well or housing 62 and 74 formed therein adapted to accommodate one of the rear wheels of the vehicle, when assembled. Quarter panels on conventional vehicles often include unused box-like structures, which the present invention uses to advantage in a ventilation system.

As illustrated in FIG. 2, the rear compartment of the car frame 10, in addition to providing a compartment or area 54 for the engine and a compartment or area 52 for the luggage, also includes ventilation plenums or chambers 55 and 57. The quarter panels 60 and 63 include side vents 66 and 67, respectively, disposed on either side of the car frame 10 so that when the vehicle is moving air will flow through the side vents 66 and 67 into the plenum chambers 55 and 57 in the direction as illustrated in the arrows in FIG. 2.

The rear compartment includes a solid wall 82 separating the luggage area 52 from the engine area 54. The plenum 57 extends rearwardly along one side the engine area 54 and is used for cooling. The plenum 55, on the other side of the engine area 54 extends rearwardly to the back end of the car and extends along the engine area 54 and luggage area 52.

Various wall structures are associated with the engine and luggage areas to maintain them separate from each other. Such structural details are well known and hence will not be described in detail.

Figure 3:
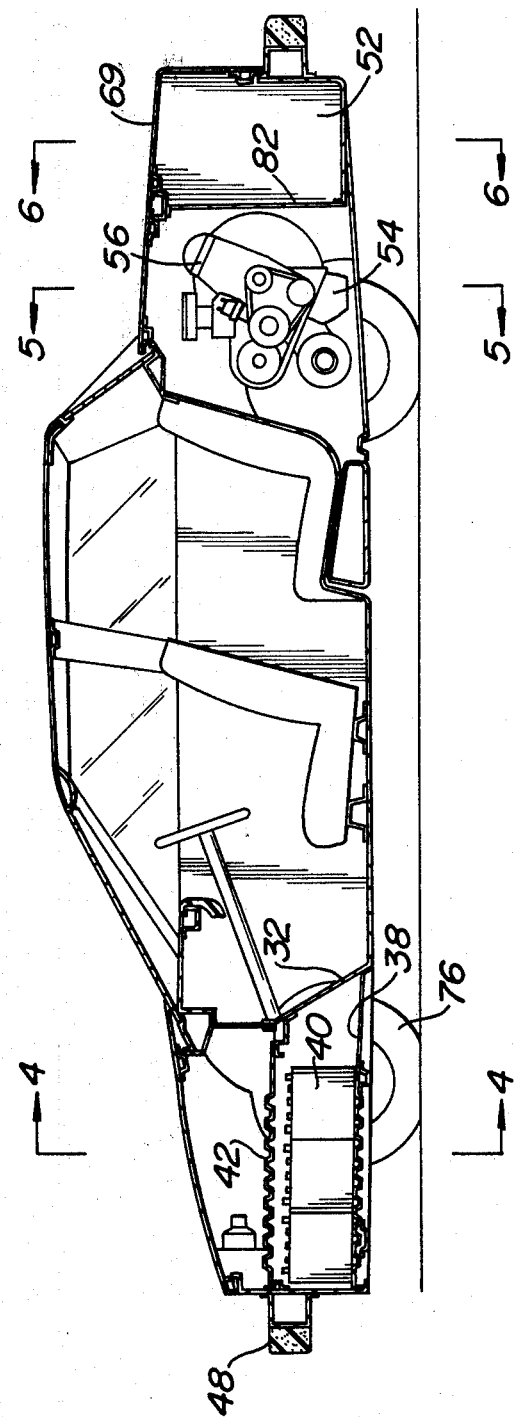
FIG. 3 is a cross-sectional view taken along lines 3—3 of FIG. 1.
Figure 4:
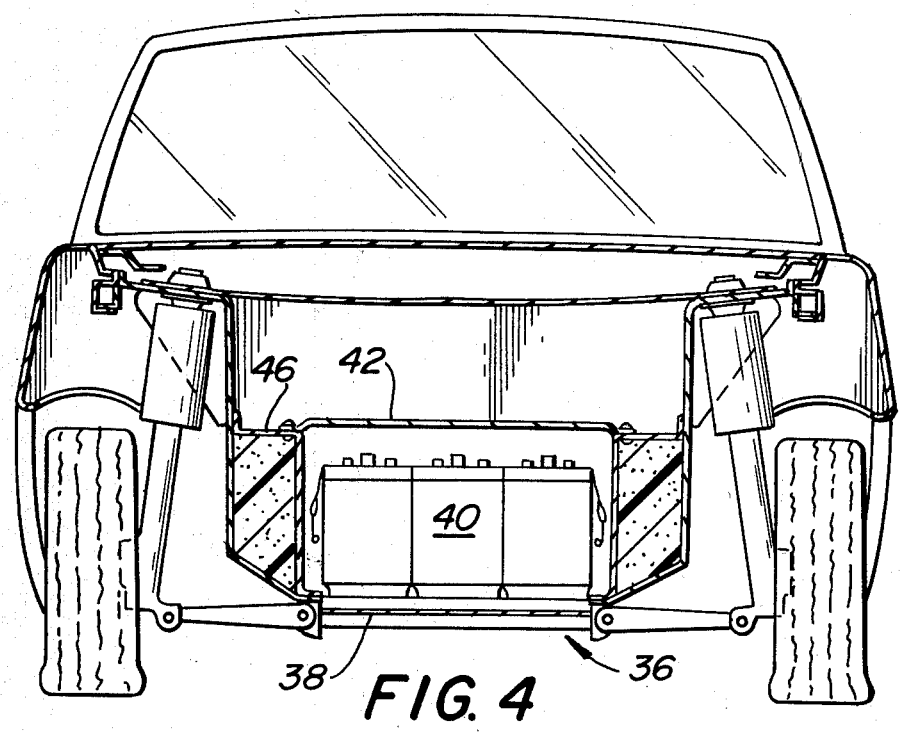
FIG. 4 is a cross-sectional view taken along lines 4—4 of FIG. 3.
Figure 5:
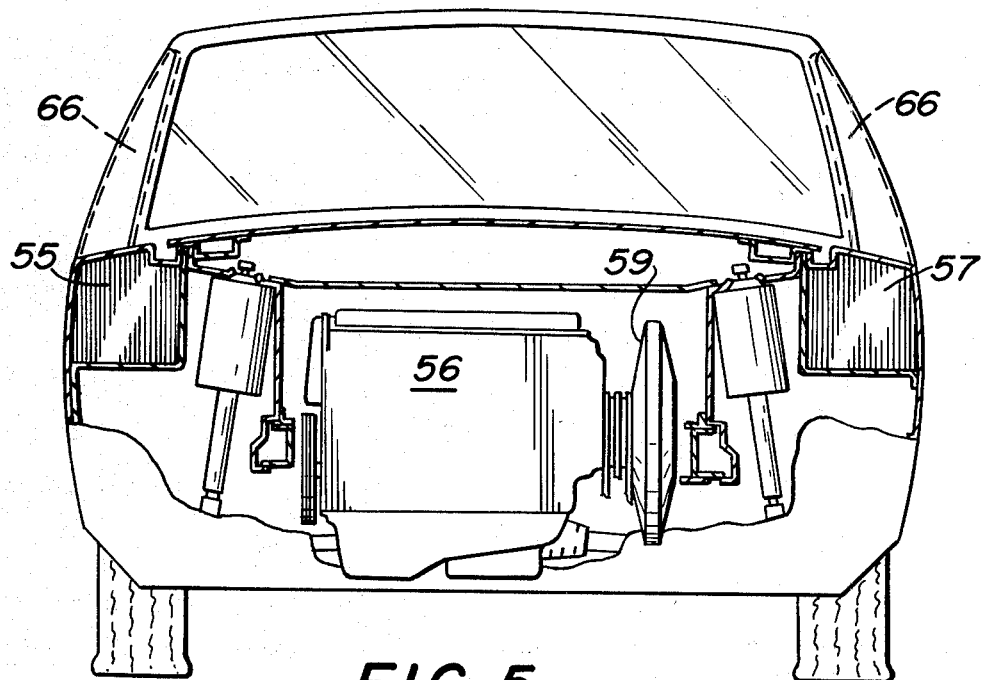
FIG. 5 is a cross-sectional view taken along lines 5—5 of FIG. 3.

One of the features of the car frame 10 illustrated involves the overall seating arrangement. The entire seating package is located forward approximately 4 to 5 inches over conventional arrangements. As a result of this forward movement, there is some penetration of the front wheel housings accommodating the front wheels 76 into the front passenger compartment. This may be seen by referring to the front wheel locations illustrated in FIG. 3. This arrangement, however, does not effect the comfort level of the front seat passengers particularly because it is common practice to have two passengers riding in the front seat. For example, front seats 78 and 80 may be bucket seats of conventional design.

Because the entire seating arrangement, including the front seats 78 and 80 and rear seat 31, is moved forwardly, the rear passenger compartment is located ahead of the rear wheel wells 62 and 63. Because the entire seating arrangement is moved forward and the rear wheel wells or housings 60 and 74 do not penetrate into the rear occupant space, the width of the rear seat 31 is considerably wider and more comfortable for three passengers than many rear seats used heretofore. Heretofore, the wheel well space limited the width of the rear seat and made it uncomfortable for three passengers.

Figure 6:
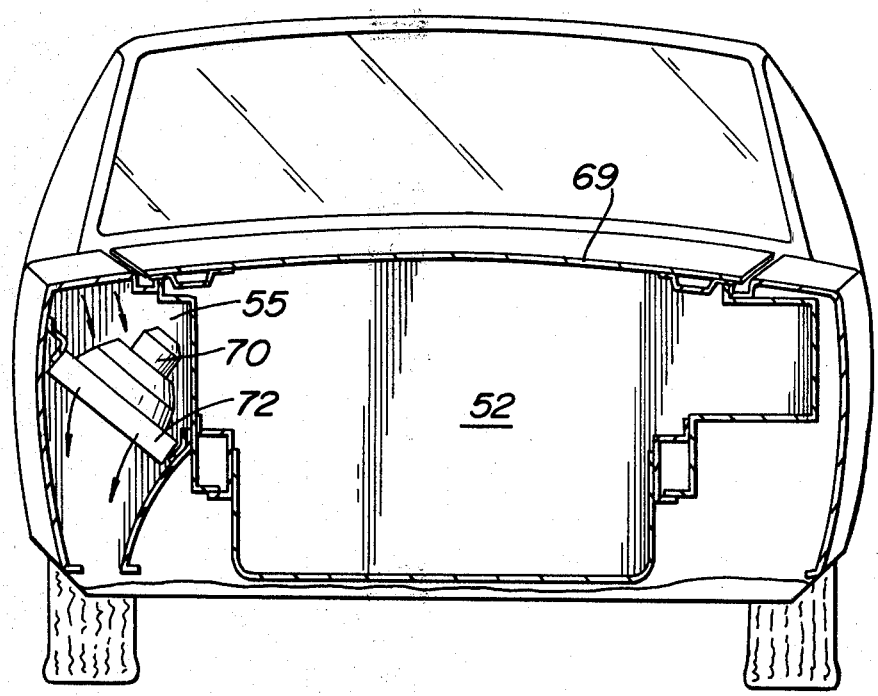
FIG. 6 is a cross-sectional view taken along lines 6—6 of FIG. 3.

The forward placement or location of the passenger seats, in effect locating the rear wheel housings 60 and 74 rearwardly with respect to the seat arrangement, further makes it possible to locate the engine 56 and other relatively heavy components directly above the rear suspension of the vehicle close to the rear axle of the automobile (not illustrated) generally aligned with the wheel housings. At the same time, placement of the engine and other components forwardly over the wheel wells 60 and 74 makes it possible to provide the rear luggage area 52, irregular in shape as illustrated in FIGS. 2 and 6, behind the area 54 which stores the engine 56, electric motor 61 and other electronic and mechanical components.

Another feature of the car frame 10 as related to the present invention is related to the ventilation system associated with the rear compartment of the vehicle in which the frame illustrated is to be incorporated. The ventilation plenum or chamber 57 is formed by various wall structures 68 which provides a rear housing. The walls of the housing 68 are shaped so as to receive the air from the vent 67 and direct it directly into the chamber 54. The chamber 54 includes the engine 56 and the various other components associated with the engine previously mentioned which require cooling. When the vehicle is moving forward, air is directed in the direction of the arrow through the vent 67 and into the plenum chamber 57 to cool the components within the engine area or compartment 54.

In like manner, when the vehicle is moving forward, air is directed through the vent 66 into the plenum chamber 55. A fan 70, suitably driven by means not illustrated, and a radiator 72 are provided within the compartment 55. Operation of the fan with the radiator 72 in conjunction with the air flow within the chamber 55 provides cooling for the heat generated within the engine area. The ventilation helps cool the overall rear compartment.

Figure 7:
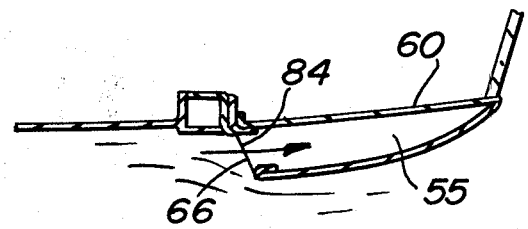
FIG. 7 is a cross-sectional view taken along lines 7—7 of FIG. 1.

As clearly illustrated in FIG. 7, the vents 66 and 67 extend outwardly away from the sides of the car body. They extend sharply enough outwardly so as to directly receive the air from the outside when the vehicle is moving forward. The extending openings, which may include screens 84, provide advantages over flat vents of the type illustrated in the aforementioned U.S. Pat. No. 3,520,243 which does not effectively intercept the air flow as effectively as the vents of the present invention.

It has been seen that the present invention has provided two advantages. First, the overall seating arrangement that makes possible a more comfortable ride for passengers. The overall seating arrangement has also made possible the location of the engine directly over the rear suspension of the vehicle.

The second advantage involves an overall improved cooling system which provides for ventilation from outside the vehicle through a plenum chamber directly into a compartment including the engine and electronic components. The ventilation system further includes ventilation from outside the vehicle through a second plenum chamber which includes a radiator and fan for dissipating heat generated by the engine. These two features combined make it possible to provide an improved overall hybrid car which is capable of being used as an electric car operated by a battery or diesel engine while providing both maximum riding comfort to the passengers and large storage areas for luggage in the front and rear of the car.

What is claimed is:

1. A body frame structure for a rear engine automotive vehicle comprising:
    (a) means providing a passenger compartment for front and rear seats,
    (b) a front structure providing a front compartment disposed forwardly of said passenger compartment,
    (c) a rear structure providing a rear compartment disposed rearwardly of said passenger compartment having a first area adjacent said passenger compartment, a second area behind said first area, and a substantially vertical wall structure therein for separating said areas;
    (d) said rear structure comprising a pair of side quarter panels providing side walls for said rear compartment and having rear wheel housings therein for accommodating rear wheels of said vehicle, vent openings extending outwardly from each of said quarter panels for receiving outside air, and ventilation plenums extending from each of said vent openings, disposed and extending along opposite sides of the area for receiving said engine;
    (e) said rear wheel housings being disposed rearwardly away from said rear seat in said passenger compartment beneath said rear compartment, and
    (f) means provided in said first area for receiving said rear engine in substantial transverse alignment between said rear wheel housings, and said second area adapted to provide storage space for luggage.

2. A body frame structure as set forth in claim 1 wherein one of said plenum chambers includes conduit means leading directly in the area for receiving said engine.

3. A rear engine automotive vehicle having a body frame structure comprising:
    (a) means providing a passenger compartment for front and rear seats,
    (b) a front structure providing a front compartment disposed forwardly of said passenger compartment,
    (c) a rear structure providing a rear compartment disposed rearwardly of said passenger compartment having a first area for receiving said engine, a second area for accommodating luggage, and a wall structure therein for separating said areas;
    (d) said rear structure comprising a pair of side quarter panels providing side walls for said rear compartment and having rear wheel housings therein for accommodating rear wheels of said vehicle, vent openings extending outwardly from each of said quarter panels for receiving outside air, and said rear structure including a first and second plenum chamber disposed on each side of said first area and having one of said plenum chambers connected to one of said vent openings, said first plenum area having conduit means connecting said first area thereto and said second plenum chamber includes a fan and a radiator for circulating and passing air therethrough to provide cooling of said engine,
    (e) said rear wheel housings being disposed rearwardly away from said rear seat in said passenger compartment beneath said rear compartment, and
    (f) means provided in said first area for receiving said rear engine in substantial vertical alignment between said rear wheel housings, and said second area adapted to provide storage space for luggage.

4. A body frame structure as set forth in claim 3 wherein said front compartment includes a bottom area for storing batteries and a top area for storing luggage separated by a dividing horizontal wall structure.

5. A body frame structure as set forth in claim 4 wherein a front crush beam is connected between front and rear vertical walls in said front compartment to react to frontal crashes of said vehicle.

6. A body frame structure as set forth in claim 5 wherein a fuel tank is disposed below said rear seat.

* * * * *